(No Model.) 2 Sheets—Sheet 2.
L. G. SPENCER & P. F. HAZEN.
WEIGHING SCALE.
No. 323,371. Patented July 28, 1885.
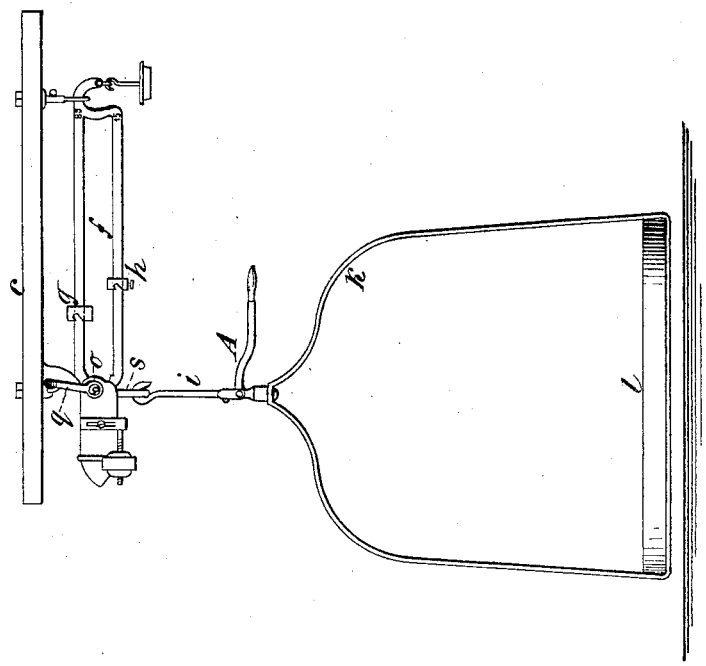

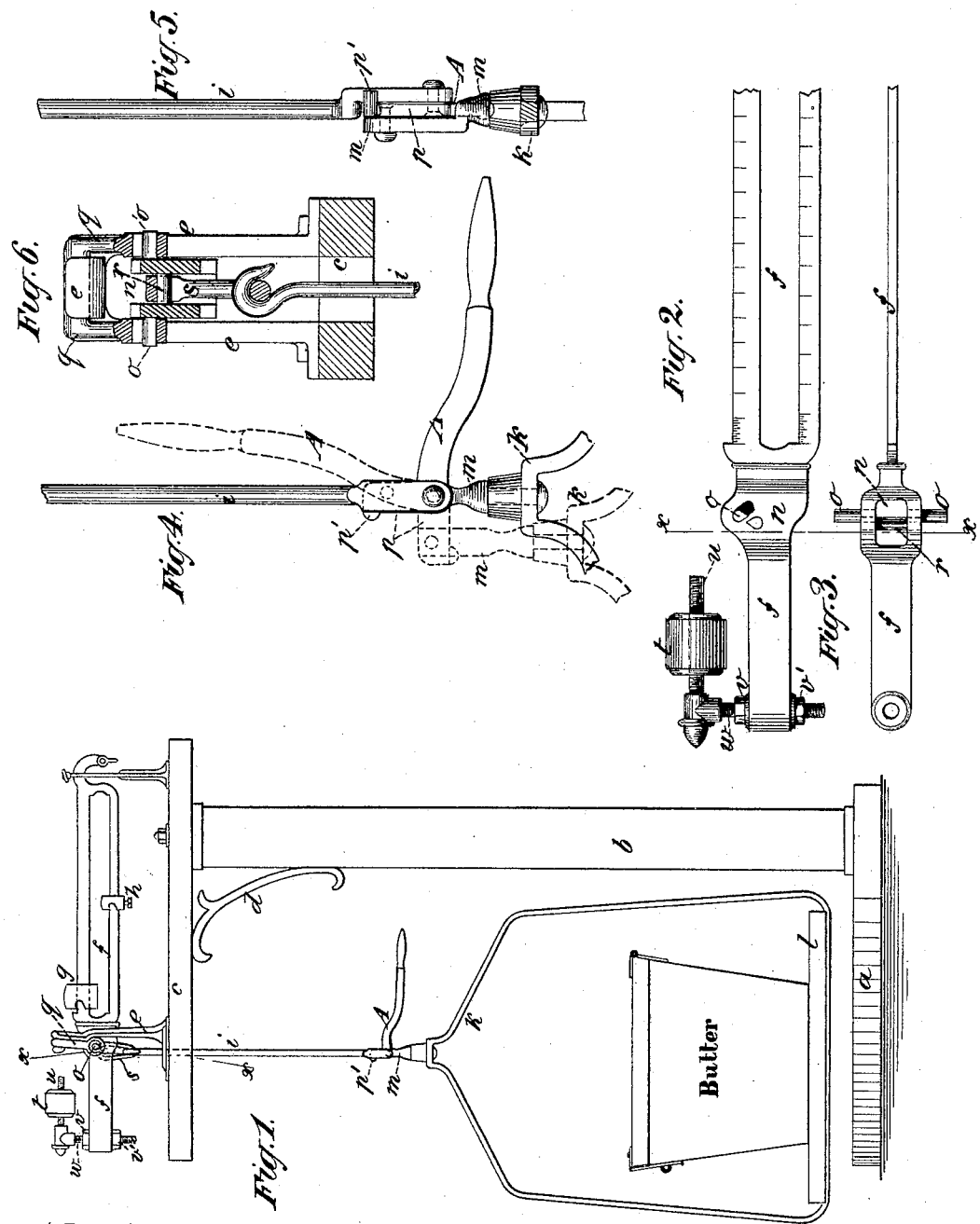

UNITED STATES PATENT OFFICE.

LUKE G. SPENCER AND PERLEY F. HAZEN, OF ST. JOHNSBURY, VERMONT, ASSIGNORS TO E. & T. FAIRBANKS & CO., OF SAME PLACE.

WEIGHING-SCALE.

SPECIFICATION forming part of Letters Patent No. 323,371, dated July 28, 1885.

Application filed October 21, 1884. (No model.)

*To all whom it may concern:*

Be it known that we, LUKE G. SPENCER and PERLEY F. HAZEN, both of St. Johnsbury, Caledonia county, Vermont, assignors to E. & T. FAIRBANKS & Co., of the same place, have invented certain new and useful Improvements in Weighing-Scales, of which the following is a specification.

Our invention aims more particularly to provide a form of scale specially adapted for weighing tubs or packages of butter, in which the weighing or sensitive mechanism of the scale shall be remote from the platform or pan, and protected from the possibility of being soiled or injured by the brine or salt from the butter-tubs, while at the same time the scale shall be convenient and effective in its operation. To these ends we form the fixed frame of our scale with the usual pillar rising from a supporting-base and surmounted with an overhanging arm, on top of which arm we fulcrum the graduated beam of the scale provided with the usual sliding poises, and from the short arm of the beam we hang a pendulous rod, on which the weighing pan or platform is suspended above the base, and on which platform the tubs are placed to be weighed, thereby bringing all the beam and weighing mechanism of the scale high above the platform, which is suspended far below the same, close to the base, whereby the mechanism is thus effectually protected from possibility of being injured by brine or other substances from the tubs or packages weighed. In the pendulous rod or connection between the beam and pan we introduce a raising and lowering joint, provided with a hand-lever, whereby the pan and its load may be raised off the base, and its weight thus thrown on the beam, or, on the contrary, may be lowered onto the base, and its weight removed from the beam, according as it is desired to load the pan and test the weight and unload the pan after the weighing, as will be understood, which feature adds to the novelty of the combination of parts first described. We also arrange the pivots and the suspensory devices of the beam in manner whereby the pivots are brought very close together, and a rapid multiplication thus produced, and we also make a minor improvement in the adjuncts of the balance-ball of the beam, whereby a better adjustment thereof is obtained; and our invention therefore consists in the several features above outlined, as hereinafter fully set forth and claimed.

In the adjoined drawings, Figure 1 presents a side elevation of our improved scale. Fig. 2 is an enlarged side elevation of the beam of the scale removed, and Fig. 3 is a plan thereof. Fig. 4 is an enlarged side elevation of the raising and lowering device in the connection between the beam and pan, and Fig. 5 is a front elevation or view edgewise of the same. Fig. 6 is a cross-section on *x x* in front of the pivots of the beam. Fig. 7 is an elevation of a modification.

Referring first to Fig. 1, *a* indicates the base of the scale, which is preferably triangular in form; but the shape is not important, as the base serves simply as a foot on which the scale is supported. *b* indicates the pillar, which rises from one corner of the triangular base, and is surmounted by the overhanging arm *c*, which is secured to the top of the pillar, and is preferably turned so as to centrally overhang the base, and is braced by a bracket, *d*, extending diagonally in the corner between the arm and pillar, as fully shown in Fig. 1. *f* indicates the graduated beam, provided with the usual poises, *g h*, which beam extends longitudinally above the arm *c*, and passes under and is suspended from the usual arch-shaped casting, *e*, which straddles the beam at its pivotal part, and is fixed at its base to the arm *c*, near the outer end thereof, as fully shown in Figs. 1 and 6. From the short arm of the beam is hung the "steelyard-rod" *i*, which connects at its lower end to the bail *k* of the weighing pan or platform *l*, on which the tubs are placed for weighing. Between the bail *k* and the rod *i* is introduced a raising and lowering device, whereby the connection between the beam and pan may be practically lengthened or shortened, so as to drop the pan on the base, and thus remove its stress from the beam, or raise it off the base and throw the stress on the beam, as shown in Fig. 1. This raising and lowering device consists, preferably, of an elbow-lever or crank-lever, A, (shown in Figs. 1, 4, and 5,) which is pivoted at its elbow or bend to the lower end of the rod *i*, which latter is flattened and offset, as shown best in Figs. 4 and 5, to admit the crank-lever. The short arm or crank-arm $p$ of this elbow-lever is pivoted at its outer end to a link or short connecting-rod, $m$, which is connected to the apex of the bail $k$ and swiveled in its connection, as will be readily understood from Figs. 1, 4, and 5, so that the bail and its pan may turn on the link $m$ without turning the rod $i$ or its connections. The long arm of the lever A projects laterally, and is terminated with a handle adapted to the grasp of the hand, as fully shown in Figs. 1 and 4, and it will therefore be seen that when the hand-lever A is swung down into a horizontal position, as shown by full lines in Figs. 1 and 4, the crank-arm $p$ will be brought up into a vertical position, and the pan $l$ and its load thus raised off the platform and its stress thrown on the beam, as shown in Fig. 1, so that the poises may now be run out on the beam to test the weight of the load on the pan, as will be readily understood. When the weight is thus determined, the hand-lever A may be swung up into a vertical position, as shown by dotted lines in Fig. 4, which will lower the crank-arm $p$ into a horizontal position, and thus drop the pan onto the base and remove the weight from the beam, and thus permit the pan to be unloaded or loaded without jarring or injuring the pivots of the scale, as will be readily appreciated. It will therefore be seen that by the described construction a very simple and convenient form of scale is produced, which is specially adapted for weighing tubs of butter or similar merchandise, as all the beam, lever, and pivot work of the scale is situated far above the platform, and as no working part of the scale is below the platform the mechanism of the scale is therefore in no way subject to become injured by the brine or salt likely to fall from the tubs as they are placed on and removed from the platform. At the same time it will be seen that the general construction of the scale is simple and inexpensive, and as convenient to operate as an ordinary droplever platform-scale, while being much lighter and simpler than the ordinary platform-scale.

By referring to Figs. 4 and 5 it will be seen that when the hand-lever is moved into its horizontal position to raise the pan a lateral projection or stop, $p'$, on the crank-arm $p$ will strike the end of the rod $i$, and thus limit the raising motion and hold the rod $i$, crank $p$, and link $m$ all in line, so that the parts will thus tend to remain in the said position, and will therefore retain the pan and its load suspended until the lever A is again raised, as will be readily understood.

Referring to Figs. 2, 3, and 6, the construction of the pivotal part of the beam, whereby an important advantage is secured, will be understood. The beam is made considerably wider at the location of the fulcrum than usual, and in this widened part a recess or mortise, $n$, extends vertically through the enlargement, as shown well in Figs. 3 and 6.

Now, $o$ $o$ indicate the main pivots or fulcrum-pivots of the beam, which extend on either side from the outer walls of the mortised part $n$, said pivots being received, as usual, in the fulcrum-loop $q$, which is hung from the arch $e$ in about the usual manner. Now, $r$ indicates the pivot of the short arm of the beam, which extends transversely across the interior of the mortise $n$, and is supported in the inner walls thereof, not protruding from the exterior, as shown in Figs. 6, 3, and 2. The suspensory loop $s$, connected with the rod $i$, therefore fits within the mortise $n$ and hangs on the pivot $r$, and it will now be readily seen that by this construction the pivots $o$ $r$ are brought exceedingly close to each other, their distance apart not exceeding the width of one of the pivots, as seen best in Fig. 2, so that the short arm of the scale is therefore reduced to the short length stated, and its ratio to the long arm therefore rendered very great, so that a very rapid multiplication in the leverage of the beam is thereby obtained, which enables the beam and other parts to be made much smaller than usual and yet obtain greater range or capacity for weighing, which is an important advantage, as will be readily appreciated.

It will be readily understood that the position of the pivots $o$ $r$ and loops $q$ $s$ might be reversed without departing from the idea shown; but the position illustrated is considered preferable.

We do not of course limit ourselves to the exact form of the raising and lowering device between the beam and pan, as any equivalent device may be used without departing from the novel plan of scale shown.

Referring to Figs. 1 and 2, $t$ indicates the usual balance-ball of the beam, which turns like a nut on the horizontal screw-stem $u$, mounted on the end of the beam, on which screw the ball is adjustable back or forth, as usual, for balancing the beam. This horizontal screw $u$ is, however, mounted on the top of a vertical bolt or crew, $w$, which fits in the end of the beam, and is vertically adjustable therein by the aid of the upper and lower nuts, $v$ $v'$, whereby the horizontal screw and its ball may be adjusted bodily up or down and held firmly at any desired adjustment by tightening the nuts against the end of the beam, thereby enabling the balancing adjustment of the beam to be made very much finer, and at the same time with a much greater range, than could be the case with the horizontal adjustment of the ball alone, as heretofore used.

It is not necessary that the supporting-frame of the scale be constructed in all cases with the pillar $b$ and base $a$, as the arm $e$ may constitute the supporting-frame alone, this arm being adapted to be fixed in the manner of a bracket to the wall or to the ceiling, with the beam supported from the under side of the arm, as shown in Fig. 7. In most cases, however, the form shown in Fig. 1 will be adopted as preferable, as it is portable, while the form shown in Fig. 7 is fixed, although simpler in construction.

We are aware that it is not broadly new to adjust the balance-ball and its support vertically, and therefore do not seek to cover such in this application.

What we claim is—

1. The combination, in a scale, with a supporting frame-work, of a scale-beam and its necessary adjuncts fulcrumed on the frame, a weighing pan or platform placed below the beam and suspended therefrom, and a raising and lowering device in the connection between pan and beam, for raising the pan off the base and throwing its stress onto the beam, and vice versa, substantially as herein set forth.

2. The combination, with the base or foot $a$, column $b$, and overhanging arm $c$, of the beam $f$ and its necessary adjuncts supported on said arm, the suspensory rod $i$, hung from the short arm of the beam, and pan or platform $l$, suspended from said rod, with a raising and lowering device in the connection between rod and pan, substantially as and for the purpose set forth.

3. In a scale having an overhead beam and an underlying pan suspended therefrom, a raising and lowering device consisting of a cranked or elbow lever, A, jointed into the connection between beam and pan, substantially as herein set forth.

4. In a scale, the combination, with the supporting-frame and the beam $f$, with the suspending-rod $i$, bail $k$, and pan $l$, of the swiveled link $i$ and the elbow-lever A, jointed between the link and rod, substantially as and for the purpose set forth.

5. In a scale, substantially such as set forth, the combination, with the pan $l$, its bail $k$, and with the beam $f$ and its rod $i$, of the elbow-lever A, jointed between the rod and bail, and having its crank-arm provided with the stop $p'$, arranged and operating substantially as and for the purpose set forth.

6. The combination, with the beam, its balance-ball $t$, and the horizontal stem $u$, of the bolt $w$, passing through a hole in said beam and supporting the stem $u$, and arranged vertically on the end of said beam, and the nuts $v$ and $v'$ on said bolt, one above and the other below the beam, substantially as and for the purposes specified.

LUKE G. SPENCER.
PERLEY F. HAZEN.

Witnesses:
A. B. NOYES,
D. DEAN PATTERSON.